United States Patent
Yuk et al.

(10) Patent No.: US 9,184,900 B2
(45) Date of Patent: Nov. 10, 2015

(54) METHOD AND APPARATUS FOR COORDINATING PERFORMANCE OF MULTIPLE CARRIERS

(75) Inventors: Young Soo Yuk, Anyang-si (KR); Ki Seon Ryu, Anyang-si (KR); In Uk Jung, Anyang-si (KR); Yong Ho Kim, Anyang-si (KR); Eun Jong Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 861 days.

(21) Appl. No.: 13/254,816

(22) PCT Filed: Mar. 4, 2010

(86) PCT No.: PCT/KR2010/001354
§ 371 (c)(1),
(2), (4) Date: Dec. 22, 2011

(87) PCT Pub. No.: WO2010/101424
PCT Pub. Date: Sep. 10, 2010

(65) Prior Publication Data
US 2012/0093079 A1   Apr. 19, 2012

Related U.S. Application Data

(60) Provisional application No. 61/157,538, filed on Mar. 4, 2009, provisional application No. 61/169,709, filed on Apr. 15, 2009.

(30) Foreign Application Priority Data

Mar. 4, 2010   (KR) .................. 10-2010-0019311

(51) Int. Cl.
*H04L 5/00* (2006.01)
*H04W 28/18* (2009.01)
(Continued)

(52) U.S. Cl.
CPC ............. *H04L 5/0091* (2013.01); *H04W 28/18* (2013.01); *H04W 72/04* (2013.01); *H04W 88/08* (2013.01)

(58) Field of Classification Search
None
See application file for complete search history.

(56) References Cited

U.S. PATENT DOCUMENTS 5,915,210 A   6/1999   Cameron et al.
2005/0111535 A1   5/2005   Saey
(Continued)

FOREIGN PATENT DOCUMENTS

KR   1020060109799   10/2006
KR   1020070015897   2/2007

OTHER PUBLICATIONS

I-Kang Fu, "Harmonized Text Proposal for Multi-carrier DC Reply Comments—Network Entry", Jul. 14, 2009; IEEE C802.16m—09/1604r1.*

(Continued)

*Primary Examiner* — Kodzovi Acolatse
(74) *Attorney, Agent, or Firm* — Lee, Hong, Degerman, Kang & Waimey

(57) ABSTRACT

The present invention relates to a wireless access system which supports multiple carriers, and disclosed is a method for coordinating the performance of the multiple carriers and an apparatus for supporting same. The method for coordinating the performance of the multiple carriers according to the present invention broadly consists of two steps. For example, the method comprises the steps of coordinating the basic performance of the multiple carriers in mobile user equipment and coordinating the extended performance of the multiple carriers in the mobile user equipment.

12 Claims, 7 Drawing Sheets

(51) Int. Cl.
  *H04W 88/08* (2009.01)
  *H04W 72/04* (2009.01)

(56) References Cited

U.S. PATENT DOCUMENTS

| | | | |
|---|---|---|---|
| 2006/0223574 A1* | 10/2006 | Chandra | 455/552.1 |
| 2007/0165731 A1 | 7/2007 | Xiao et al. | |
| 2008/0242340 A1* | 10/2008 | Kang et al. | 455/525 |
| 2008/0259842 A1 | 10/2008 | Cai | |
| 2009/0022178 A1 | 1/2009 | Ji et al. | |
| 2009/0219910 A1 | 9/2009 | Han et al. | |
| 2009/0262699 A1 | 10/2009 | Wengerter et al. | |
| 2009/0274085 A1 | 11/2009 | Wang et al. | |
| 2010/0113043 A1 | 5/2010 | Hsuan et al. | |
| 2010/0220674 A1* | 9/2010 | Fu | 370/329 |
| 2010/0272051 A1* | 10/2010 | Fu et al. | 370/329 |
| 2011/0274066 A1 | 11/2011 | Tee et al. | |

OTHER PUBLICATIONS

U.S. Appl. No. 13/120,900, Office Action dated Apr. 25, 2014, 9 pages.

Lee et al., "A New Size-Based Burst Assembly Scheme for OBS Switches", Lecture Notes in Computer Science, vol. 3981, May 2006, pp. 1140-1148.

Prasetyo et al., "On the Guard Band-Based Coarse Frequency Offset Estimation Technique for Burst OFDM Systems", IEEE VTC, 2000, pp. 220-224.

U.S. Appl. No. 13/120,900, Final Office Action dated Sep. 13, 2013, 9 pages.

Qualcomm Europe, "Multicarrier Control for LTE-Advanced," R1-091460, 3GPP TSG RAN WG1 #56bis, Mar. 2009, 6 pages.

Motorola, "Comparison of PDCCH Structures for Carrier Aggregation," R1-091326, 3GPP TSG RAN1 #56bis, Mar. 2009, 5 pages.

U.S. Appl. No. 13/120,900, Office Action dated Mar. 27, 2013, 15 pages.

* cited by examiner (a)

(b)

METHOD AND APPARATUS FOR COORDINATING PERFORMANCE OF MULTIPLE CARRIERS

CROSS-REFERENCE TO RELATED APPLICATIONS

This application is the National Stage filing under 35 U.S.C. 371 of International Application No. PCT/KR2010/001354, filed on Mar. 4, 2010, which claims the benefit of earlier filing date and priority to Korean Application No. 10-2010-0019311, filed on Mar. 4, 2010, and also claims the benefit of U.S. Provisional Application Nos. 61/169,709, filed on Apr. 15, 2009, and 61/157,538, filed on Mar. 4, 2009, the contents of which are all hereby incorporated by reference herein in their entirety.

TECHNICAL FIELD

The present invention relates to a wireless access system supporting multicarrier, and more particularly, to a method for negotiating multicarrier capabilities and an apparatus for supporting the same.

BACKGROUND ART

Hereinafter, a carrier will be briefly described.

A user may perform a modulation operation with respect to the amplitude, frequency and/or phase of a sine wave and a periodic pulse wave. A sine wave or a pulse wave for carrying information is called a carrier.

Examples of a carrier modulation scheme include a Single-Carrier Modulation (SCM) scheme and a Multicarrier Modulation (MCM) scheme. Among others, the SCM scheme is to perform modulation with respect to all information carried on one carrier.

The MCM scheme refers to a technology of dividing an overall bandwidth channel of one carrier into several sub-channels each having a small bandwidth and transmitting a plurality of narrowband sub-carriers through the sub-channels.

In the MCM scheme, each of the sub-channels is approximated so as to have a flat channel due to the small bandwidth. A user can compensate for distortion of a channel using a simple equalizer. In addition, the MCM scheme is implemented at a high speed using Fast Fourier Transform (FFT) and is more advantageous in high-speed data transmission than the SCM scheme.

As capability of a base station and/or a terminal have been developed, a frequency bandwidth provided or used by the base station and/or the terminal has expanded and throughput of data processed by the terminal has been increased. Accordingly, in the embodiments of the present invention, a multicarrier system supporting a wideband by aggregating one or more carriers is disclosed, unlike the above-described MOM scheme.

For example, in order to increase transmit capacity of radio data, a bandwidth of 200 KHz to 1.25 MHz has been used in second-generation radio communication and a bandwidth of 5 MHz to 10 MHz has been used in third-generation radio communication. A bandwidth is increased to 20 MHz in a 3GPP LTE system or an IEEE 802.16m system as a fourth-generation wireless access system which has been currently developed.

A method of increasing a bandwidth in order to increase transmit capacity of radio data is inevitable. However, in this case, since a large bandwidth is supported even when the level of a desired service is low, power consumption is very high. In addition, a current system may not be reused in order to support such requirements.

In order to solve such problems, a multicarrier transmission method of simultaneously transmitting and receiving data using several bandwidths has been researched. A multicarrier system may use multiple carriers which are contiguously located on a frequency axis or multiple carriers which are separated on a frequency axis.

DISCLOSURE

Technical Problem

An object of the present invention is to provide a method for enabling a mobile terminal supporting multicarrier to efficiently access a network in a wideband wireless access system.

Another object of the present invention is to provide a method of performing optimized multicarrier capabilities negotiation by a mobile terminal using multicarrier while minimizing influence on an existing wireless access system.

Another object of the present invention is to provide a method of providing information exchanged with a base station by a mobile terminal according to multicarrier capabilities of the mobile terminal.

Another object of the present invention is to provide a method for negotiating multicarrier capabilities (i.e. coordinating performance of multicarrier) suitable for characteristics of each mobile terminal while minimizing network load, in the case where a mobile terminal which supports multicarrier capabilities and a mobile terminal which does not support multicarrier capabilities coexist.

Another object of the present invention is to provide a mobile terminal apparatus and a base station apparatus which perform the above-described objects.

The technical problems solved by the present invention are not limited to the above technical problems and those skilled in the art may understand other technical problems from the following description.

Technical Solution

In order to solve the technical problems, the present invention discloses a method and apparatus for supporting a mobile terminal in a wireless access system supporting multicarriers. More particularly, the present invention discloses various methods for negotiating multicarrier capabilities and an apparatus for supporting the same.

In a first embodiment of the present invention, there is provided a method for negotiating multicarrier capabilities in a wireless access system, comprising steps of transmitting a first request message (AAI_REG-REQ) including a first multicarrier capability parameter indicating basic multicarrier capabilities of a mobile terminal to a base station, receiving a first response message (AAI_REG-RSP) including a second multicarrier capability parameter indicating basic multicarrier capabilities of the base station from the base station, and receiving a multicarrier advertisement message (AAI_MC-ADV) including information about a multicarrier configuration supported by the base station. If the mobile terminal supports multicarrier, the method may further comprise transmitting a second request message (AAI_MC-REQ) including a parameter indicating extended multicarrier capabilities of the mobile terminal from the mobile terminal to the base station based on the information about the multicarrier configuration, and receiving a second response message (AAI_MC-RSP) including information about assigned carriers which are assigned to the mobile terminal by the base station.

In a second embodiment of the present invention, there is provided a method for negotiating multicarrier capabilities in a wireless access system, comprising, at a base station, receiving a first request message (AAI_REG-REQ) including a first multicarrier capability parameter indicating basic multicarrier capabilities of a mobile terminal from the mobile terminal, transmitting a first response message (AAI_REG-RSP) including a second multicarrier capability parameter indicating basic multicarrier capabilities of a base station to the mobile terminal, and broadcasting a multicarrier advertisement message (AAI_MC-ADV) including information about a multicarrier configuration supported by the base station to the mobile terminal. If the mobile terminal supports multicarrier, the method may further comprises receiving a second request message (AAI_MC-REQ) including a parameter indicating extended multicarrier capabilities of the mobile terminal from the mobile terminal based on the information about the multicarrier configuration, and transmitting to the mobile terminal a second response message (AAI_MC-RSP) including information about assigned carriers which are assigned to the mobile terminal.

In a third embodiment of the present invention, there is provided a mobile terminal for negotiating multicarrier capabilities in a wireless access system, comprising a transmission module configured to transmit a Radio Frequency (RF) signal, a reception module configured to receive a RF signal, and a processor including a medium access control (MAC) entity for controlling negotiation of the multicarrier capabilities. The processor controls the steps of transmitting a first request message including a first multicarrier capability parameter indicating basic multicarrier capabilities of the mobile terminal to a base station; receiving a first response message including a second multicarrier capability parameter indicating basic multicarrier capabilities of the base station from the base station, and receiving a multicarrier advertisement message including information about a multicarrier configuration supported by the base station.

If the mobile terminal supports multicarrier, the processor may further controls the steps of transmitting a second request message including a parameter indicating extended multicarrier capabilities of the mobile terminal from the mobile terminal to the base station based on the information about the multicarrier configuration, and receiving a second response message including information about carriers assigned to the mobile terminal by the base station.

In the first to third embodiments, the first multicarrier capability parameter may indicate that the mobile terminal does not support a multicarrier mode, supports a basic multicarrier mode, support a multicarrier aggregation or support a multicarrier switching. In addition, the second multicarrier capability parameter may indicate that the base station does not support the multicarrier mode, support the basic multicarrier mode, support a multicarrier aggregation or support a multicarrier switching.

In the first to third embodiments, the information about the multicarrier configuration may include a physical carrier index (PCI) indicating available carriers supported by the base station.

In the first to third embodiments, the information indicating the extended multicarrier capabilities may include a number field indicating the number of candidate assigned carriers simultaneously supported by the mobile terminal and a physical carrier index field indicating the candidate assigned carriers.

In the first to third embodiments, the information about the assigned carriers includes a field indicating the number of carriers assigned to the mobile terminal and a physical carrier index field indicating carriers assigned to the mobile terminal.

In the first and second embodiments, the method may further include receiving, by the mobile terminal from the base station, a global carrier configuration (AAI_Global-Config) message including information about available carriers of a network, to which the base station belongs.

In the first to third embodiments, the information about the available carriers of the network may include a field indicating the number of carrier groups, a multicarrier index (MCI) field indicating the multicarrier configuration and a physical carrier index (PCI) field indicating physical carriers for all available carriers.

In the first to third embodiments, the global carrier configuration message is preferably transmitted just after a network entry procedure of the mobile terminal is completed.

The first to third embodiments are only some of the preferred embodiments of the present invention and various embodiments of the present invention, to which the technical features of the present invention are applied, are understood by those skilled in the art from the detailed description of the present invention.

Advantageous Effects

According to the embodiments of the present invention, the following effects are obtained.

First, a mobile terminal supporting multicarrier can efficiently access a network.

Second, the mobile terminal supporting multicarrier can perform an optimized multicarrier capability negotiation process while minimizing influence on the existing wireless access system.

Third, by performing multicarrier capability negotiation processes of two steps, it is possible to additionally perform multicarrier capability negotiation only when the mobile terminal supports MC capabilities. In addition, a mobile terminal which does not support MC capabilities does not need to perform an additional MC capability negotiation process. Accordingly, by exchanging only information necessary in the multicarrier capability negotiation process depending on whether or not the mobile terminal supports MC capability, it is possible to reduce unnecessary overhead.

The effects of the present invention are not limited to the above-described effects and advantages which are not expected in the implementation of the embodiments of the present invention may be obtained from the following description. That is, effects which are not intended in the implementation of the present invention may be derived from the embodiments of the present invention.

BEST MODE

Figure 1:
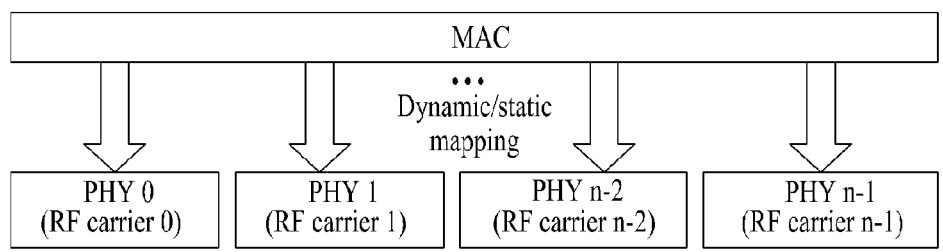
FIGS. 1(*a*) and 1(*b*) are diagrams illustrating a method of transmitting or receiving a signal based on a multi-band radio frequency (RF).
Figure 1:
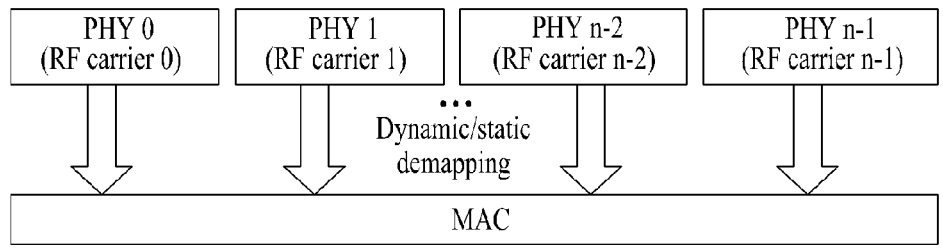

The present invention discloses a method and apparatus which supports a mobile terminal in a wireless access system supporting multicarrier. More particularly, the present invention discloses various methods for negotiating multicarrier capabilities and an apparatus supporting the same.

The following embodiments are proposed by combining constituent components and characteristics of the present invention according to a predetermined format. The individual constituent components or characteristics should be considered optional factors on the condition that there is no additional remark. If required, the individual constituent components or characteristics need not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In the description of the drawings, procedures or steps which render the scope of the present invention unnecessarily ambiguous will be omitted and procedures or steps which can be understood by those skilled in the art will be omitted.

The embodiments of the present invention are disclosed on the basis of a data communication relationship between a base station and a mobile terminal. In this case, the base station is used as a terminal node of a network via which the base station can directly communicate with the mobile terminal. Specific operations to be conducted by the base station in the present invention may also be conducted by an upper node of the base station as necessary.

In other words, it will be obvious to those skilled in the art that various operations for enabling the base station to communicate with the mobile terminal in a network composed of several network nodes including the base station will be conducted by the base station or other network nodes other than the base station. The term "Base Station" may be replaced with the terms fixed station, Node-B, eNode-B (eNB), advanced base station (ABS) or access point as necessary.

The term "mobile station" may also be replaced with the terms user equipment (UE), subscriber station (SS), mobile subscriber station (MSS), mobile terminal, advanced mobile station (AMS) or terminal as necessary.

A transmitter refers to a node for transmitting a data or voice service and a receiver refers to a node for receiving a data or voice service. Accordingly, in uplink transmission, a terminal becomes a transmitter and a base station becomes a receiver. Similarly, in downlink transmission, a terminal becomes a receiver and a base station becomes a transmitter.

The embodiments of the present invention can be supported by the standard documents disclosed in any one of wireless access systems, such as an IEEE802.xx system, a 3$^{rd}$ Generation Partnership Project (3GPP) system, a 3GPP Long Term Evolution (LTE) system, and a 3GPP2 system. That is, for the steps or portions, which are not described in order to make the technical spirit of the present invention clear, refer to the above documents.

In addition, all the terms disclosed in the present document may be described by the above standard documents. In particular, the embodiments of the present invention may be supported by at least one of P802.16-2004, P802.16e-2005 P802.16Rev2 and P802.16m documents, which are the standard documents of the IEEE802.16 system.

Hereinafter, exemplary embodiments of the present invention will be described in detail with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

General Concept of Multicarrier

Hereinafter, in the following multicarrier system, one or more carriers are aggregated and used, unlike the MOM scheme of dividing one carrier into sub-carriers and utilizing the sub-carriers.

FIGS. 1(*a*) and 1(*b*) are diagrams illustrating a method of transmitting or receiving a signal based on a multiband radio frequency (RF).

In order to efficiently utilize multiband or multicarrier, a technique of managing several carriers (e.g., several frequency allocations (FA)) by one medium access control (MAC) entity has been proposed.

In FIG. 1, in a transmitter and a receiver, one MAC layer may manage several carriers in order to efficiently use multicarrier. In order to efficiently transmit or receive multicarrier, it is assumed that both the transmitter and the receiver can transmit or receive multicarrier. Since the frequency carriers (FCs) managed by one MAC layer do not need to be contiguous to each other, flexible resource management is possible. That is, both contiguous aggregation and non-contiguous aggregation are possible.

In FIGS. 1(*a*) and 1(*b*), a physical layer (PHY) 0, a physical layer 1, . . . , a physical layer n−2 and a physical layer n−1 represent multiple bands of the present technique and each band may have an FA size assigned for a specific service according to a predetermined frequency policy. For example, the physical layer 0 (RF carrier 0) may have a frequency band size assigned for a general FM radio broadcast and the physical layer 1 (RF carrier 1) may have a frequency band size assigned for mobile telephone communication.

The frequency bands may have different frequency band sizes according to frequency band characteristics. However, in the following description, for convenience of description, it is assumed that each FA has a size of A [MHz]. Each FA may be a carrier frequency for utilizing a baseband signal in each frequency band. Hereinafter, each FA is referred to as "carrier frequency band" or simply "carrier" representative of each carrier frequency band if such use will not lead to confusion. Recently, as in the 3GPP LTE-A, the above carrier may be referred to as "component carrier" in order to be distinguished from a subcarrier used in an MOM scheme.

Therefore, the above "multiband" scheme may be referred to as a "multicarrier" scheme or a "carrier aggregation" scheme.

In order to transmit a signal through multiple bands as shown in FIG. 1(a) and receive a signal through multiple bands as shown in FIG. 1(b), the transmitter/receiver needs to include an RF module for transmitting the signal through the multiple bands. In FIG. 1, the method of configuring "MAC" is determined by a base station regardless of downlink (DL) and uplink (UL).

In brief, the present technique refers to a technique of enabling one MAC entity (hereinafter, simply referred to as "MAC" if such use will not lead to confusion) to manage a plurality of RF carriers so as to transmit/receive a signal. The RF carriers managed by one MAC do not need to be contiguous. According to the present technique, more flexible resource management is possible.

In an IEEE 802.16m system which is one of wireless communication systems, a carrier type is largely divided into two types from the viewpoint of a base station. For example, the carrier type may be divided into a fully configured carrier type (FCCT) and a partially configured carrier type (PCCT).

The fully configured carrier type refers to a carrier able to transmit and receive all control information and data and the partially configured carrier type refers to a carrier able to transmit and receive only downlink (DL) data. At this time, the partially configured carrier may be used for a service such as an enhanced multicast broadcast service (E-MBS) for providing mainly DL data.

A carrier assigned to a mobile terminal may be two carrier types. For example, the carrier type may be divided into a primary carrier and a secondary carrier. At this time, a base station may assign one primary carrier and a plurality of secondary carriers to a mobile terminal.

The primary carrier is selected from fully configured carriers and most control information of a mobile terminal is transmitted over the primary carrier. The secondary carrier may be selected from fully configured carriers or partially configured carriers and may be further assigned according to a request or instruction of a mobile terminal or a base station.

A mobile terminal may transmit and receive all control information and control information of a secondary carrier through a primary carrier and transmit and receive data to and from a base station through a secondary carrier. At this time, a secondary carrier which is set as a fully configured carrier allocated to a specific mobile terminal may be set as a primary carrier of another mobile terminal.

In the embodiments of the present invention, the numbers of carriers used in downlink and uplink need not be identical. That is, the type and number of actually used carriers may be differently configured according to the characteristics of multicarrier supported by a base station and a mobile terminal. Currently, a method of utilizing a carrier may be differently configured according to Quality of Service (QoS) of a mobile terminal or a load condition of a base station.

Multicarrier may be divided into an available carrier set and an assigned carrier set according to a method of utilizing multicarrier. The available carrier set refers to a set of all carriers present in a base station and the assigned carrier set refers to a set of carriers actually assigned to a specific mobile terminal. At this time, the assigned carrier set may be a part or whole of the available carrier set.

A base station may transmit information about an available carrier set to a mobile terminal through a specific broadcast channel. Since information about multicarrier is similar to co-located frequency assignment (FA) information which was transmitted for inter-frequency handover in the existing system (e.g., IEEE 802.16e), the information about multicarrier may be transmitted through a neighboring base station advertisement (AAI_NBR-ADV) message. Information about multicarrier may be transmitted through an additional message for transmitting multicarrier configuration information.

A mobile terminal may receive information about multicarrier when initially entering a network. If the mobile terminal does not receive the information about the multicarrier when initially entering the network, the mobile terminal may continuously use carriers allocated thereto without the information about the multicarrier.

In order to support multicarrier transmission, the mobile terminal and the base station exchange parameters associated with multicarrier capabilities. This process is generally performed during a network entry process or a similar process thereof (e.g., a registration process, an initial ranging process or basic capability negotiation process).

A base station allocates a primary carrier and secondary carriers to a mobile terminal according to multicarrier capability parameters exchanged with the mobile terminal and a current load condition of the base station. Although the primary carrier is generally used to enter a network, the base station may assign another fully configured carrier as a primary carrier, for primary carrier distribution.

Carriers assigned to a specific mobile terminal by a base station are referred to as assigned carriers and a set of assigned carriers is maintained until update is performed due to a predetermined reason. Although a set of assigned carriers is assigned to the mobile terminal, all the carriers assigned to the mobile terminals are not always used. That is, all or part of the set of assigned carriers is actually used to transmit data and carriers actually used to transmit data are referred to as active carriers. At this time, the primary carrier always becomes an active carrier and the secondary carriers may be operated as active carriers or inactive carriers according to a command of a base station.

The assigned carriers are assigned in association with radio frequency capabilities of a mobile terminal and a base station. The use of the active carriers is determined according to a current service requirement of a mobile terminal. Inactive carriers may be turned off for power conservation and the turned-off carriers are not necessary for transmission of associated control channels. Thus, it is possible to reduce network overhead.

Multicarrier Capability Negotiation Method

Hereinafter, a multicarrier capability negotiation (i.e. a coordination of performance of multicarrier) method between a mobile terminal and a base station according to an embodiment of the present invention will be described.

The base station may transmit an advanced-preamble (A-preamble) including information about a system bandwidth and information about a carrier configuration to mobile terminals located in its cell region. At this time, the A-preamble may include one primary advanced (PA) preamble and three secondary advanced (SA) preambles.

The mobile terminal may determine whether the carrier is a fully configured carrier by decoding the PA preamble transmitted from the base station. At this time, the mobile terminal may perform a network entry (or reentry) process through the fully configured carrier. During the network entry process, the mobile terminal and the base station may exchange multicarrier capabilities.

In the embodiments of the present invention, in order to efficiently exchange the multicarrier capabilities between the mobile terminal and the base station, a two-step multicarrier (MC) capability negotiation process is proposed. The two-step MC capability negotiation process includes a first step of a basic MC capability negotiation process and a second step of an extended MC capability negotiation process.

The basic MC capability negotiation process of the first step is performed regardless of the multicarrier capabilities of the mobile terminal and the extended MC capability negotiation process of the second step is performed according to the multicarrier capabilities of the mobile terminal.

The basic MC capability negotiation process of the first step is performed in order to determine a progress direction of the extended MC capability negotiation process of the second step, by exchanging information indicating whether or not multicarrier is supported between the mobile user terminal and the base station and information about a multicarrier mode in the case in which multicarrier is supported.

The extended MC capability negotiation process of the second step is performed in order to perform negotiation for details of MC capabilities of the mobile terminal. At this time, the MC capabilities exchanged in the extended MC capability negotiation process become transmission/reception capabilities of the mobile terminal.

At this time, the base station may set some of an available carrier set to assigned carriers according to the MC capabilities of the mobile terminal. That is, the extended MC capability negotiation process of the second step refers to a process of assigning multicarrier to the mobile terminal according to the MC capabilities of the mobile terminal and the network load of the base station or the communication policy of the base station.

In the MC capability negotiation process, a MAC message used in each step may differ according the type of a wireless access system. For example, in the IEEE 802.16m system, the first step of the MC capability negotiation process may be performed in a subscriber terminal basic capability negotiation process (MOB_SBC-REQ/RSP) and the second step may be performed in a registration process (MOB_REG-REQ/RSP).

Since the subscriber terminal basic capability negotiation process is performed before an authentication procedure, a problem may occur in security. Accordingly, as another method, the first step of the MC capability negotiation process may be performed in a registration process and the second step may be performed in a process of transmitting and receiving a multicarrier request/response message, which is newly defined in the IEEE 802.16m system.

The mobile terminal and the base station may perform the basic MC capability negotiation process of the first step and then determine whether or not the extended MC capability negotiation process of the second step is performed and/or the procedure of performing the extended MC capability negotiation process of the second step according to the result of the negotiation process of the first step. At this time, although various multicarrier capability parameters which may be defined for the negotiation process of the first step may be included, the multicarrier capability parameters are preferably minimized for efficiency of the negotiation process of the second step.

That is, the negotiation process of the first step may be performed even in a mobile terminal which does not support MC capabilities and the negotiation process of the second step may be selectively performed only in a mobile terminal which supports MC capabilities. Accordingly, it is possible to minimize influence of the MC capability negotiation process of the second step on the mobile terminal which does not support MC capabilities.

Information about MC capabilities transmitted from the mobile terminal to the base station in the MC capability negotiation process of the second step may be variously defined.

First, the mobile terminal may independently transmit information about MC capabilities of the mobile terminal regardless of an MC configuration of the base station.

For example, the MC capabilities of the mobile terminal may include at least one of an MC mode supported by the mobile terminal, the number of radio frequencies (RFs) used for simultaneous transmission/reception of the mobile terminal, a maximum bandwidth of each RF transmitter/receiver, support of a guard band, a transmission (Tx) spectral mask shape property of a transmitter included in the mobile terminal, information about a frequency band supported by the mobile terminal and a maximum throughput of the mobile terminal.

This method has an advantage that update does not need to be performed on a per base station basis because the information about MC capabilities obtained by performing one MC negotiation process may be used for all base stations having various configurations. Even when the MC configuration of the base station is complicated, the mobile terminal transmits the same amount of information to each base station.

Second, the mobile terminal may relatively provide information about MC capabilities to the base station according to the MC configuration of the base station.

For example, the mobile terminal may transmit a combination of transmittable/receptible carriers according to the MC capabilities of the base station.

In this case, if the configuration of the base station is simple, it is possible to efficiently transmit information with a small number of bits. In contrast, if the MC configuration of the base station is changed, the mobile terminal and the base station should transmit newly changed MC configuration items. In addition, if the MC configuration of the base station is complicated, the number of combinations of carriers transmitted by the mobile terminal is increased and thus complexity is increased. In addition, since the amount of information which may be used by the base station is low, it is difficult to assign radio resources to the mobile terminal using another method in addition to the information about MC capabilities.

Accordingly, the mobile terminal may appropriately use the above-described two methods when transmitting the information about the MC capabilities to the base station.

Figure 2:
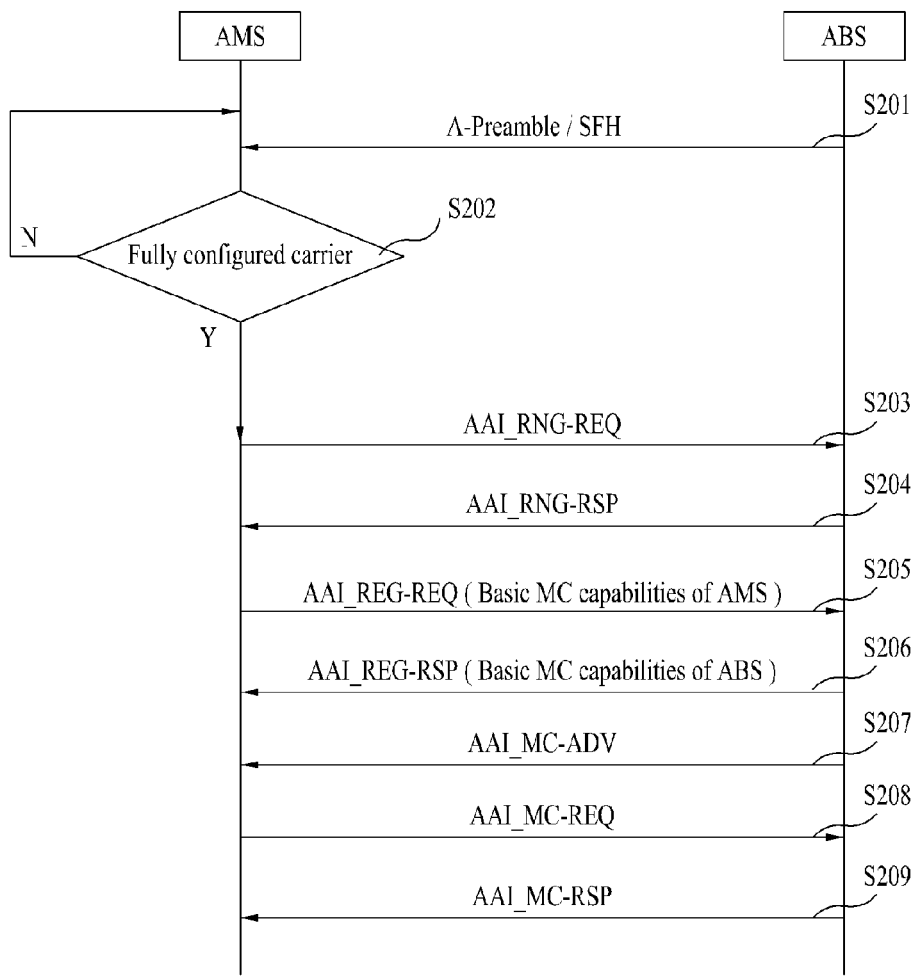
FIG. 2 is a diagram showing an example of a multicarrier capability negotiation process according to an embodiment of the present invention.

FIG. 2 is a diagram showing an example of an MC capability negotiation process according to an embodiment of the present invention.

FIG. 2 shows an operation for enabling a mobile terminal (AMS) to support a subsequent MC operation in a network entry initialization process. That is, FIG. 2 shows a two-step process of, at the AMS, negotiating with the base station (ABS) for multicarrier support and acquiring information about the multicarrier configuration of an available carrier set supported by the base station and information about assigned carriers.

For example, the ABS provides information about supportable carriers and multicarrier configurations obtained by combining the supportable carriers to the ABS. Thereafter, the AMS may acquire information about a subset (that is, an assigned carrier set) of carriers which may be provided by the ABS.

Referring to FIG. 2, the AMS may receive an A-preamble from the ABS when entering a network. Accordingly, the AMS may receive a super frame header (SFH), extended system parameters, and system configuration information, etc. (S201).

The AMS may determine whether the A-preamble transmitted in step S201 is transmitted on a fully configured carrier so as to determine whether or not a next step is performed.

This is because the AMS can perform a network entry procedure only over the fully configured carrier in the IEEE 802.16m system (S202).

Accordingly, the AMS performs the next step if the A-preamble of step S201 is transmitted on the fully configured carrier and repeats step S201 if the A-preamble is not transmitted on the fully configured carrier.

The AMS transmits and receives ranging messages AAI_RNG-REQ/RSP to and from the ABS so as to perform an initial ranging process in order to perform initial network entry (S203 and S204).

The AMS may exchange basic MC capability information with the ABS while performing a registration process with the ABS. That is, the AMS may transmit a registration request (AAI_REG-REQ) message including the basic MC capability information supported by the AMS to the ABS (S205).

In step S205, the AMS may transmit only an MC mode supported by the AMS to the ABS in a simplest form of the basic MC capability information. Table 1 shows an example of the basic MC capability information including only the MC mode.

TABLE 1

| b1, b2 | Multicarrier Capabilities |
| --- | --- |
| 00 | No MC modes |
| 01 | Basic MC mode |
| 10 | Multicarrier Aggregation |
| 11 | Multicarrier Switching |

Referring to Table 1, the MC mode may be expressed by 2-bit code. If the MC mode is set to "00", then it indicates that the AMS is in a single carrier mode which does not support the MC mode. If the MC mode is set to "01", then it indicates that the AMS supports the basic MC mode. If the MC mode is set to "10", then it indicates that the AMS supports a MC aggregation. If the MC mode is set to "11", then it indicates that the AMS supports a MC switching.

At this time, the basic MC mode indicates that the AMS supports an optimized carrier scanning operation included in an MC operation and a primary carrier change operation as the MC operation of the AMS.

Referring to FIG. 2 again, the ABS may transmit a registration response (AAI_REG-RSP) message including the basic MC capability information supported by the ABS to the AMS (S206).

If the ABS receives the AAI_REG-REQ message including the basic MC capability information of Table 1 in step S205, only the MC mode supported by the ABS is preferably included in the basic MC capability information of step S206.

The AMS negotiates with the ABS for the supportable MC mode through steps S205 and S206. At this time, in FIG. 2, it is assumed that the AMS and the ABS support multicarrier.

The ABS may periodically broadcast a multicarrier advertisement (AAI_MC-ADV) message including information about the multicarrier configuration supported by the ABS to the AMS. At this time, the information about the multicarrier configuration may include information about carriers assigned to the AMS by the ABS (S207).

Table 2 shows an example of the format of an MC advertisement (AAI_MC-ADV) message used in the embodiments of the present invention.

TABLE 2

| Field | Size (bits) | Content |
| --- | --- | --- |
| MAC Control Message Type | 8 | |
| Multicarrier configuration change count | 4 | Incremented by 1 upon each update |
| Serving BS Carrier Number | 3 | |
| Serving BS Uniformity Flag | 1 | 0: All carriers supported by serving ABS have the same Protocol Version, SFH_Info 1: otherwise |
| Physical Carrier Index of current carrier | 6 | The carrier that ABS broadcast this message: the physical carrier index refers to AAI_Global-Config Message. |
| MAC Protocol Version | 8 | Consistent with REV.2 definition, with new MAC protocol version 9 defined for 16m |
| For(i=1; i<= serving BS carrier Number-1; i++){ | | |
| Physical Carrier Index | 6 | |
| SA-Preamble Index | 10 | // Physical carrier index in AAI_Global-Config message |
| ~ | | |
| ~ | | |

Referring to Table 2, the AAI_MC-ADV message may include a multicarrier configuration change count parameter which is incremented by 1 whenever the multicarrier configuration of the ABS is changed, a serving BS carrier number field indicating the number of carriers managed by a serving BS, a serving BS uniformity flag indicating a protocol version of carriers supported by the serving BS, a physical carrier index field indicating a physical carrier index of a current carrier, a MAC protocol version parameter indicating a MAC protocol version defined for the 16m system, and a physical carrier index parameter indicating a physical carrier index of an assigned carrier supported by the ABS. The AAI_MC-ADV message may further include information about an SA preamble transmitted from the ABS.

At this time, the AAI_MC-ADV message of step S207 is periodically transmitted and may be transmitted before step S205 or step S203.

According to the multicarrier configuration information indicated in the AAI_MC-ADV message, the AMS may determine a subset of carriers, which can be simultaneously supported by the AMS, under hardware capabilities of the AMS. Thereafter, the AMS may transmit an AAI_MC-REQ message including a set of physical carrier indexes supported by the AMS to the ABS. That is, the AMS may exchange the detailed MC capabilities of the multicarrier supported by the AMS with the ABS.

The AMS may inform the ABS of the physical MC capabilities supported by the AMS and transmit a multicarrier request (AAI_MC-REQ) message including extended MC capability information to the ABS in order to request information about the carriers assigned to the AMS (S208).

Table 3 shows an example of the format of the AAI_MC-REQ message used in the embodiments of the present invention.

TABLE 3

| Field | Size (Bit) | Content |
|---|---|---|
| MAC control Message type | | |
| Number of Candidate Combinations (N) | 4 | |
| For (i=0, i<N; i++){ | | |
|     Number of Candidate Assigned Carrier (Nc) | 3 | |
|     For (j=0, j<Nc; j++){ | | |
|         Physical Carrier Index | 6 | The carriers AMS can simultaneously support |
|     } | | |
| } | | |
| Support of data transmission over guard sub-carrier | 1 | 0b0 = not supported<br>0b1 = supported |

Referring to table 3, the AAI_MC-REQ message may include a MAC control message type field indicating the type of a current message, a Number of Candidate Combination field indicating the number of candidate combinations, a Number of Candidate Assigned Carrier field indicating the number of candidate assigned carriers, a Physical Carrier Index (PCI) indicating carriers simultaneously supported by the AMS and a Support of data transmission over guard sub-carrier field indicating support of data transmission over guard subcarrier.

The ABS which receives the AAI_MC-REQ message may transmit to the AMS a multicarrier response (AAI_MC-RSP) message including information about carriers assigned to the AMS (S209).

Table 4 shows an example of the format of the AAI_MC-RSP message used in the embodiments of the present invention.

TABLE 4

| Field | Size (bits) | Content |
|---|---|---|
| MAC Control Message type | | |
| Number of assigned carrier (N) | 3 | |
| For (i=0; i<N; i++){ | | |
|     Physical carrier index | 3 | |
|     Support of data transmission over guard sub-carrier | 1 | 0b0 = not supported<br>0b1 = supported |
| } | | |

Referring to Table 4, the AAI_MC-RSP message may include a MAC control message type field indicating the type of a current message, a Number-of-Assigned-Carriers field indicating the number of carriers assigned to the AMS, and a Physical Carrier Index field indicating carriers assigned to the AMS as a physical carrier index corresponding to the number-of-assigned-carriers field. The AAI_MC-RSP message may further include a support-of-data-transmission-over-guard-subcarrier field.

In FIG. 2, the AAI_MC-RSP message is transmitted from the ABS to the AMS as a response to the AAI_MC-REQ message. If a list of carriers assigned to the AMS is changed, the ABS may transmit the AAI_MC-RSP message without a request from the AMS, in order to update the list.

If the AMS does not support MC in steps S205 and S206, steps S207 to S209 may not be performed. Accordingly, the AMS which supports only a single carrier can perform an efficient network operation without additional message overhead.

As another aspect of the present invention described with reference to FIG. 2, in the case where the configuration information of the available carrier included in the multicarrier of the ABS is not broadcast to the AMS, the AMS may use the message and parameter format indicating the detailed MC capabilities of the AMS which will be described below, instead of the message and parameter form described with reference to Tables 1 to 4, in the first basic MC capability negotiation process and the second extended MC capability negotiation process. The ABS transmits the AAI_REG-RSP message and the AAI_MC-RSP message including the configuration information of the available carrier.

That is, the AMS may transmit the AAI_REG-RSP message including Table 5 to the ABS in step S203. Table 5 shows another example of the basic MC capability information supported by the AMS.

TABLE 5

| Name | Length (bits) | Value | Content |
|---|---|---|---|
| Multicarrier Mode | 2 | 00: Single Carrier<br>01: Basic MC mode<br>10: MC aggregation<br>11: MC Switching | |
| Supportable RF Band Class | 8 | bit #0: Band I<br>bit #1: Band II<br>bit #2: Band III<br>bit #3: Band IV<br>...<br>bit #7: Band VII | bitmap<br>0: Not supported<br>1: supported |
| The Number of RF Receiver | 2 | | Number of RF receiver can be activated simultaneously. |
| The Number of Transmitter | 2 | | Number of RF Transmitter can be activated simultaneously |
| Maximum Throughput | TBD | | 10 Mbps class<br>20 Mbps class<br>100 Mbps class<br>1 Gbps class |

Referring to Table 5, the basic MC capability information may include information about an RF band supported by the AMS, the number of RF receivers of the AMS which may be simultaneously activated, the number of RF transmitters of the AMS which may be simultaneously activated and information about maximum throughput of the AMS, in addition to the MC mode of Table 1.

If the AAI_REG-REQ message including the basic MC capability information of Table 5 is received in step S205, the ABS may transmit the AAI_REG-RSP message including the basic MC capability information shown in Table 6 to the AMS.

TABLE 6

| Name | Length (bits) | Value | Content |
|---|---|---|---|
| Multicarrier Mode | 2 | 00: Single Carrier<br>01: Basic MC mode | |

TABLE 6-continued

| Name | Length (bits) | Value | Content |
|---|---|---|---|
| | | 10: MC aggregation 11: MC Switching | |
| Supportable RF Band Class | 8 | bit #0: Band I bit #1: Band II bit #2: Band III bit #3: Band IV ... bit #7: Band VII | bitmap 0: Not supported 1: supported |
| Multicarrier Configuration Index (MCI) | 2 | | MCI for carrier group which contains the primary carrier |
| Component Carrier Index (CCI) | 2 | | The carrier index of the primary carrier of the current carrier |
| ... | ... | | ... |

Referring to Table 6, the MC mode information indicates an MC mode supported by the ABS and supportable RF band information indicates an RF band supported by the ABS. An MC configuration index (MCI) includes MC configuration information which is currently supported by the ABS and is obtained by indexing the MC configuration information. The MCI is an MCI for a carrier group containing the primary carrier. A component carrier index (CCI) indicates the position of the primary carrier, through which the information is currently transmitted, in the MC configuration supported by the ABS.

The AMS which receives the AAI_MC-ADV message in step S207 transmits the AAI_MC-REQ message shown in Table 7 to the ABS so as to send information about the extended MC capabilities of the AMS to the ABS. Table 7 shows an example of the format of the AAI_MC-REQ message when the MC configuration information of the ABS is not transmitted.

TABLE 7

| Name | Length (bits) | Value | Content |
|---|---|---|---|
| Supportable RF Band | 8 | Bitmap 0: Not supported 1: Supported | Bit0: Band I Bit1: Band II ... Bit 7: Band VIII |
| Number of RF Receiver | 2 | | |
| Number of RF Transmitter 1 | 2 | | |
| Number of RF Transmitter 2 | TBD | | |
| Maximum Bandwidth of RF Transmitter 1 | TBD | 400 kHz * Value | |
| Maximum Bandwidth of RF Transmitter 2 | TBD | 400 kHz * Value | |
| ... | | | |
| Maximum throughput | TBD | | 10 Mbps class 20 Mbps Class 100 Mbps Class 1 Gbps Class |

Referring to Table 7, the AAI_MC-REQ message may include a supportable RF band indicating a RF band supported by the AMS, a number of RF receiver field indicating the number of RF receivers, a field indicating the number of RF transmitters 1, a field indicating the number of RF transmitters 2, a field indicating a maximum bandwidth of the RF transmitter 1 and a field indicating a maximum bandwidth of the RF transmitter 2. The AAI_MC-REQ message may further include a maximum throughput field indicating the maximum throughput of the AMS.

The ABS which receives the extended MC capability information of Table 7 in step S208 transmits the AAI_MC-RSP message including the extended MC capability information of the ABS described with reference to Table 8 to the AMS. Table 8 shows an example of the format of the AAI_MC-RSP message when the MC configuration information of the ABS is not transmitted.

TABLE 8

| Name | Length (bits) | Value |
|---|---|---|
| Number of Assigned Carrier | TBD | |
| Information for assigned carrier in the same carrier group (or band class) as the primary carrier | | |
| MCI for this carrier group | | |
| Information for Assigned Carrier 1 | | |
| CCI for assigned carrier 1 | | |
| A: preamble index for assigned carrier 1 | TBD | |
| Carrier type | 1 | 0: Fully configured carrier 1: Partially Configured Carrier |
| Information for Assigned Carrier 2 | | |
| CCI for assigned carrier 2 | | |
| A: preamble index for assigned carrier 2 | TBD | |
| Carrier Type | 1 | 0: Fully configured carrier 1: Partially Configured Carrier |
| ... | | |
| Information for assigned carrier in the other carrier group | | |
| Band class index of this carrier group | TBD | Band I, Band II, ... |
| MCI for this carrier group | | |
| Center Frequency of aggregated bandwidth (or center frequency of the first assigned carrier in this group) | TBD | |
| Information for Assigned carrier 1 | | |
| CCI for assigned carrier 1 | | |
| A: Preamble index for assigned carrier 1 | TBD | |
| Carrier type | | 0: Fully configured carrier 1: Partially Configured Carrier |

TABLE 8-continued

| Name | Length (bits) | Value |
|---|---|---|
| Information for assigned 2 | | |
| CCI for assigned carrier 2 | | |
| A: Preamble index for assigned carrier 2 | TBD | |
| Carrier type | 1 | 0: Fully configured carrier<br>1: Partially Configured Carrier |
| ... | | |

Referring to table 8, the extended MC capability parameters of the ABS may include a number-of-assigned-carriers field indicating the number of carriers assigned to the AMS, information about carriers assigned to the same band as the primary carrier, and information about carriers assigned to a carrier group different from that of the primary carrier.

At this time, information about the carrier corresponding to the assigned carrier selected from among carriers included in the same carrier group as the primary carrier may include assignment information of the assigned carrier and may, for example, include a field indicating a CCI for an assigned carrier 1, an A-preamble index for an assigned carrier 1, and an assigned carrier type 1.

In addition, the information about the assigned carrier included in the carrier group different from that of the primary carrier may include a band class index, a field indicating an MCI for this carrier group, a center frequency of an aggregated bandwidth or a center frequency of a specific assigned carrier and information about each of assigned carriers (Information for assigned Carrier 1, 2, ... ). The information about each of the assigned carriers may include a CCI for assigned Carrier fields indicating a CCI for an assigned carrier n, an A-preamble index for the assigned carrier n and a carrier type n.

Figure 3:
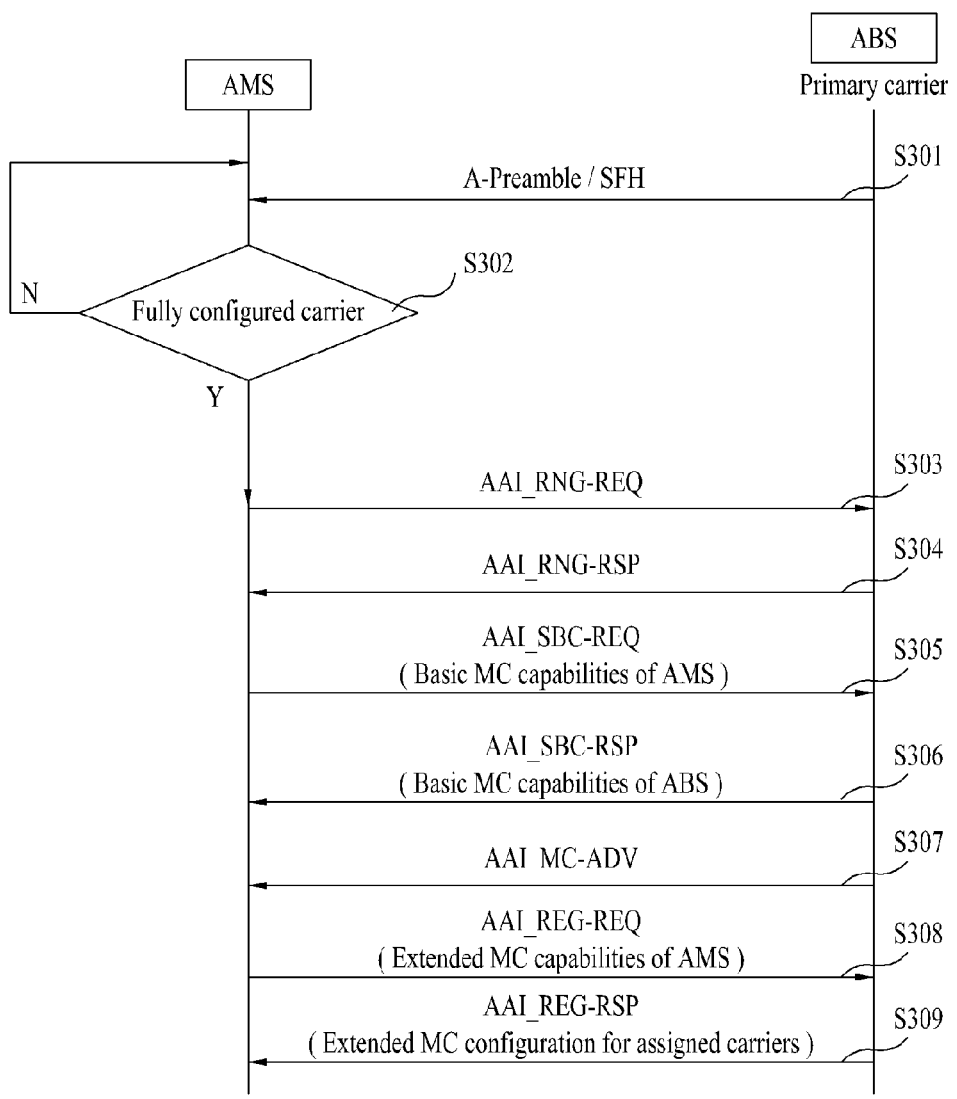
FIG. 3 is a diagram showing another example of a multicarrier capability negotiation process according to an embodiment of the present invention.

FIG. 3 is a diagram showing another example of a multicarrier capability negotiation process according to an embodiment of the present invention.

FIG. 3 is different from FIG. 2 in the process of performing the basic MC capability negotiation of the first step and the extended MC capability negotiation of the second step. For example, in FIG. 3, the AMS may negotiate for the support of the basic MC capabilities of the AMS in the subscriber terminal basic capability negotiation process before the authentication process is performed and negotiate for the support of the extended MC capabilities of the AMS in the registration process to the ABS.

Referring to FIG. 3, steps S301 to S304 of FIG. 3 are equal to steps S201 to S204 of FIG. 2 and thus, for a description thereof, refer to FIG. 2.

The AMS transmits a subscriber terminal basic capability request (AAI_SBC-REQ) message including the basic MC capability information including the MC mode of Table 1 to the ABS (S305).

The ABS transmits a subscriber terminal basic capability response (AAI_SBC-RSP) message including the basic MC capability information including the MC mode supported by the ABS to the AMB as a response to the AAI_SBC-REQ message. At this time, for the MC mode of the ABS included in step S306, refer to Table 1 (S306).

The AMS negotiates with the ABS for the supportable MC mode through step S305 and S306. At this time, in FIG. 3, it is assumed that the AMS and the ABS support multicarrier.

Referring to FIG. 3 again, the ABS may periodically broadcast a multicarrier advertisement (AAI_MC-ADV) message (see Table 2) including information about the multicarrier configuration supported by the ABS to the AMS. At this time, the information about the multicarrier configuration may include information about carriers assigned to the AMS by the ABS (S307).

The AMS may inform the ABS of the physical MC capabilities supported by the AMS and transmit a registration request (AAI_REG-REQ) message including extended MC capability information (see Table 3) to the ABS in order to request information about the carriers assigned to the AMS (S308).

The ABS which receives the AAI_REG-REQ message may transmit to the AMS a registration response (AAI_REG-RSP) message including information about carriers assigned to the AMS (see Table 4) (S309).

For the basic MC capability information, the extended MC capability information and other parameters used in FIG. 3, refer to the description of FIG. 2. In FIG. 3, if the AMS does not support multicarrier in the basic MC capability negotiation process (S304 to S305) of the first step, steps S307 to S309 are preferably not performed.

MC Capability Negotiation Method based on Multicarrier Configuration Index (MCI)

Figure 4:
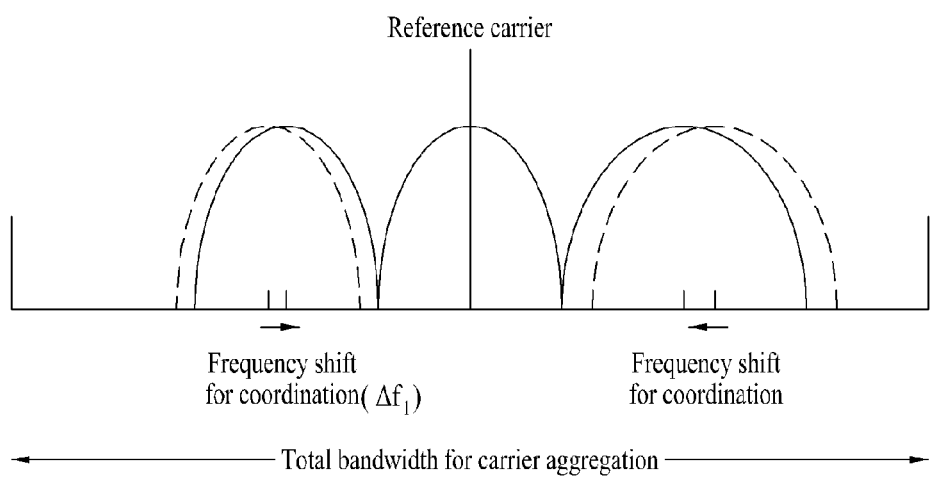
FIG. 4 is a diagram showing a carrier aggregation method according to a multicarrier configuration scheme as another embodiment of the present invention.

FIG. 4 is a diagram showing a carrier aggregation method according to a multicarrier configuration scheme as another embodiment of the present invention.

In one embodiment of the present invention, if the ABS indexes and transmits the multicarrier configuration, the ABS may efficiently inform the AMS of information about the multicarrier configuration. This information may be defined as a multicarrier configuration index (MCI).

Table 9 shows an example of an MCI used in the embodiments of the present invention.

TABLE 9

| MCI | Total Bandwidth | Number of component Carriers | Order of Component carriers (0: 5 MHz, 1: 10 MHz, 2: 20 MHz, 3: Others) |
|---|---|---|---|
| 0 | 5 | 1 | 0 |
| 1 | 10 | 1 | 1 |
| 2 | 10 | 2 | 00 |
| 3 | 20 | 1 | 2 |
| 4 | 20 | 2 | 11 |
| 5 | 20 | 4 | 0000 |
| 6 | 20 | 3 | 112 |
| 7 | 40 | 3 | 121 |
| 8 | 40 | 2 | 22 |
| ... | ... | ... | ... |
| N | 80 | 4 | 1111 |
| ... | ~100 | ... | ... |

Table 9 shows one method of configuring the MCI and the configuration of the MCI may be changed according to communication environments or user requirements. The MCI information shown in Table 9 may be transmitted to the AMS through the primary carrier assigned to each AMS.

If more restrictions are set on the carrier aggregation scheme, the MCI may be simply configured. Most important information in the configuration of the MCI includes configuration information of a center frequency and/or an individual band.

Referring to FIG. 4, the center frequency of each carrier may be moved in a center frequency direction of a reference carrier using a method of equalizing subcarrier spacing.

A frequency movement value is preferably less than half the subcarrier spacing of OFDMA, because influence of synchronization capabilities due to frequency movement is minimized in the AMS which performs an initial network entry process.

The MCI of Table 9 may be broadcast by the ABS or transmitted to a specific AMS in a unicast manner in an initial network entry process of the AMS.

Figure 5:
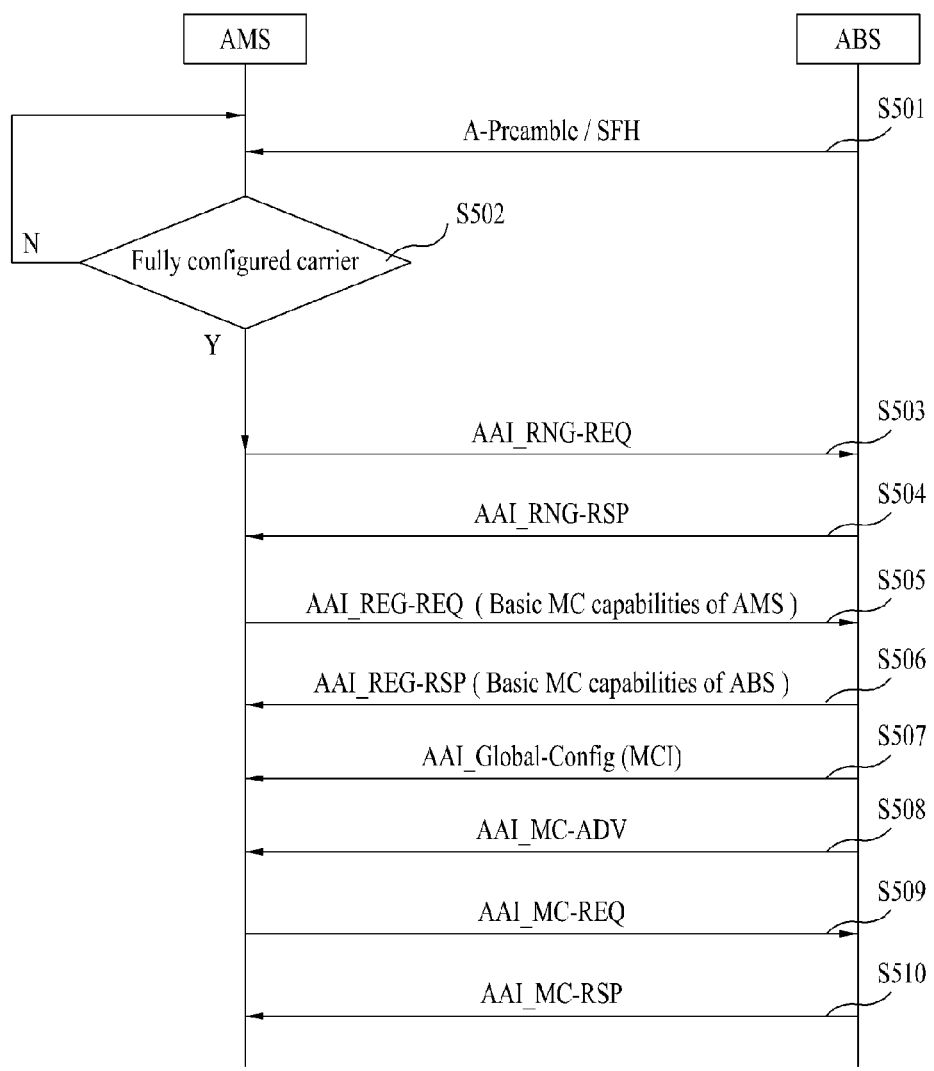
FIG. 5 is a diagram showing an example of a multicarrier capability negotiation process based on an MCI as another embodiment of the present invention.

FIG. 5 is a diagram showing an example of a multicarrier capability negotiation process based on an MCI as another embodiment of the present invention.

FIG. 5 is basically equal to FIG. 2. FIG. 5 is different from FIG. 2 in that the ABS transmits multicarrier configuration information (MCI) used in the overall network to the AMS and the ABS broadcasts a multicarrier advertisement message including information about an available carrier managed by the ABS to the AMS. Accordingly, the description of steps S501 to S506 of FIG. 5 will be replaced with the description of steps S201 to S206 of FIG. 2. Hereinafter, only a part different from FIG. 2 will be described.

The ABS may include information about carriers which can operate in a network, to which the ABS belongs, in a global carrier configuration (AAI-Global-Config) message and transmit the AAI-Global-Config message to the AMS (S507).

Step S507 is preferably performed just after the AMS finishes the network entry procedure. Table 10 shows an example of a global carrier configuration message format.

TABLE 10

| Field | Size (bits) | Content |
|---|---|---|
| MAC control Message type | 8 | |
| Number of Carrier groups | 4 | Groups of contiguous Carriers |
| For (i=0; i<Number of Carrier Groups; i++){ | | |
|     Multi-Carrier Configuration Index Across the Network | 6 | Index associated to MC |
|     Start Frequency Assignment Index | 6 | Frequency Assignment Index of the first carrier in carrier group #i |
|     Number of Carriers | 6 | |
|     For (j=0; j<Number of Carriers; j++){ | | |
|         Physical Carrier Index | 6 | Index of the physical carrier |
|         Duplexing Mode | 1 | "0" for TDD "1" for FDD |
|     } | | |
| } | | |
| Physical Carrier Index of Current Carrier | 6 | The carrier that broadcasts this message; the physical carrier index refers to AAI_Global-Config message |

Referring to Table 10, the global carrier configuration message may include a MAC control message type field indicating the type of the message, a number-of-carrier-groups field indicating the number of carrier groups of the network, and information about a physical carrier index of a current carrier. The global carrier configuration message may further include a multicarrier configuration index across the network field, a Number of carriers field indicating the number of carriers, a physical carrier index and a duplexing mode field indicating the duplexing type of the network.

The description of steps 508 to S510 of FIG. 5 are equal to steps 207 to S209 of FIG. 2 and thus a description thereof will be omitted.

Figure 6:
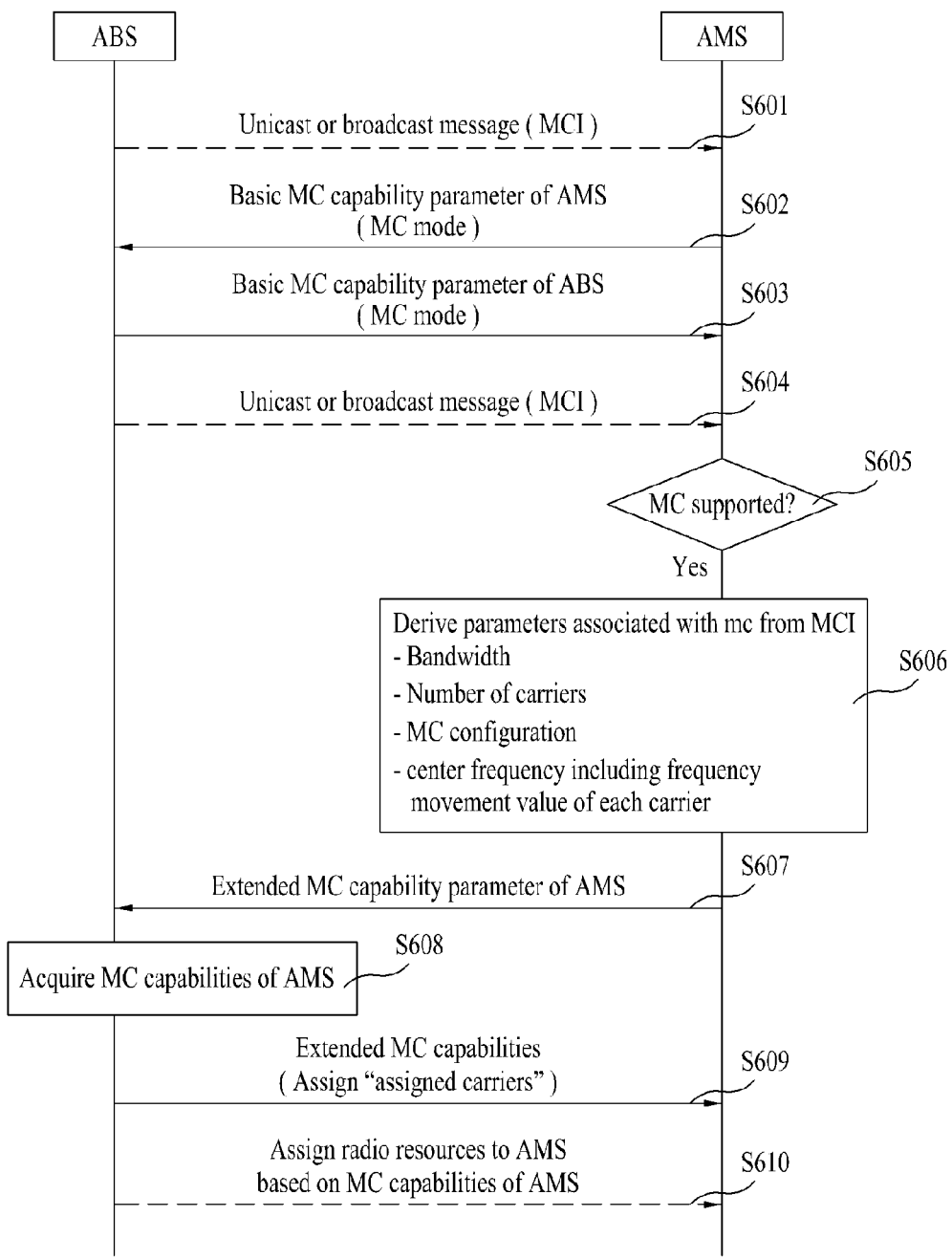
FIG. 6 is a diagram showing another example of a multicarrier capability negotiation process as another embodiment of the present invention.

FIG. 6 is a diagram showing another example of a multicarrier capability negotiation process as another embodiment of the present invention.

The ABS may transmit a MAC to the AMS in a unicast or broadcast manner (S601).

If the MCI is transmitted in the unicast manner in step S601, the MCI may be transmitted using a predetermined message (e.g., AAI_REG-RSP or AAI_Global-Config) used in the initial network entry procedure of the AMS. The ABS may include the MCI in the AAI_MC-ADV message and transmit the message to ABSs in a broadcast manner. The ABS may periodically transmit the MCI.

The AMS may transmit a first request message including basic MC capability parameters of the AMS to the ABS in order to perform the multicarrier capability negotiation process of the first step with the ABS (S602).

In step S602, the basic MC capability parameters include information indicating whether the AMS supports the MC mode and MC mode information indicating which MC mode is supported if the MC mode is supported (see Table 1).

The ABS which receives the basic MC capability parameters from the AMS may transmit a first response message including basic MC capability parameters including the MC mode indicating multicarrier capabilities supported by the ABS to the AMS as a response thereto (S603).

The ABS may periodically transmit the MCI information transmitted in step S601 or may transmit a message including an updated MCI to the AMS in a unicast or broadcast manner when the MC configuration of the ABS is changed (S604).

The AMS may determine whether the multicarrier configuration supported by the ABS is supported by the AMS (S605).

If the MC mode is supported by the AMS in step S605, the AMS may derive various parameters associated with multicarrier from the received MCI. For example, the AMS may acquire information about system bandwidth, the number of carriers, a multicarrier configuration and a center frequency including a frequency movement value of each carrier based on the MCI (S606).

The AMS may perform the basic MC negotiation process of the first step and then perform the extended MC negotiation process of the second step if both the AMS and the ABS support the MC mode.

Accordingly, the AMS may transmit a second request message including extended multicarrier capability parameters of the AMS to the ABS (S607).

In step S607, the extended MC capability parameters of the AMS may include detailed information about the multicarrier supported by the AMS. Accordingly, the ABS may acquire the MC capabilities of the AMS (S608).

The ABS which acquires the MC capability information supported by the AMS may assign carriers assigned to the AMS among available carriers. Accordingly, the ABS transmits a second response message including extended MC capability information including the information about assigned carriers to the AMS (S609).

The ABS may assign multicarrier radio resources to the AMS based on the MC capability information of the AMS (S610).

In step S605, if the AMS does not support the MC mode, the AMS and the ABS may not perform steps S606 to S610. Accordingly, by exchanging only information necessary while increasing efficiency of the operation of the AMS, it is possible to reduce unnecessary overhead occurring in the multicarrier negotiation process.

Figure 7:
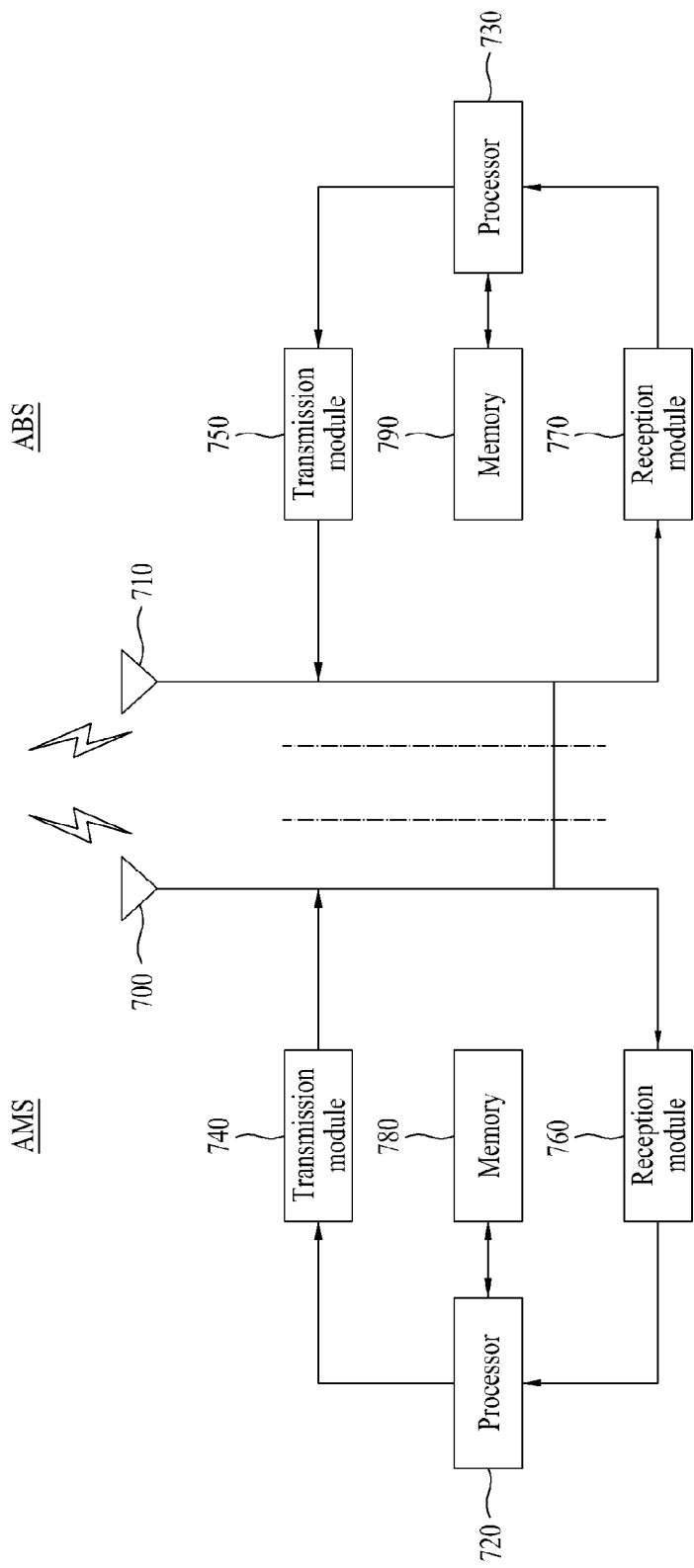
FIG. 7 is a diagram showing a mobile terminal and a base station, in which the embodiments of the present invention described with reference to FIGS. 2 to 6 may be performed, as another embodiment of the present invention.

FIG. 7 is a diagram showing a mobile terminal and a base station, in which the embodiments of the present invention described with reference to FIGS. 2 to 6 may be performed, as another embodiment of the present invention.

Each of the AMS and the ABS may include a transmitter and a receiver. The AMS may operate as a transmitter in uplink and operate as a receiver in downlink. The ABS may operate as a receiver in uplink and operate as a transmitter in downlink.

That is, the AMS and the ABS may include transmission (Tx) modules 740 and 750 and reception (Rx) modules 760 and 770 for controlling the transmission and reception of information, data and/or messages and include antennas 700 and 710 for transmitting/receiving information, data and/or messages, respectively.

At this time, the Tx module may control one or more RF transmitters and the Rx module may control one or more RF receivers. The number of RF transmitters and the number of RF receivers may be different. In the ABS, it is preferable that the Rx module controls one RF receiver to receive uplink data and the Tx module controls two or more RF transmitters to transmit downlink data.

The AMS and the ABS include processors 720 and 730 for performing the above-described embodiments of the present invention and memories 780 and 790 for temporarily or continuously storing the processing procedure of the processors. In particular, the processors 720 and 730 may support the initial network entry/reentry process, the subscriber terminal basic capability negotiation process, the ranging process and the registration process disclosed in the embodiments of the present invention. The processor may include a multicarrier module supporting carrier aggregation.

Each of the processors included in the AMS and the ABS includes a MAC entity described with reference to FIG. 1. The MAC entity may be located inside or outside each of the processors of the AMS and the ABS. That is, the AMS and the ABS may perform the operations of the embodiments of the present invention described with reference to FIGS. 1 to 6 using the MAC entities.

The Tx modules and the Rx modules included in the AMS and the ABS may perform a packet modulation/demodulation function for data transmission, a high-speed packet channel coding function, an orthogonal frequency division multiple access (OFDMA) packet scheduling function, a time division duplex (TDD) packet scheduling function and/or a channel multiplexing function.

The apparatus described with reference to FIG. 7 may implement the methods described with reference to FIGS. 1 to 6. The embodiments of the present invention may be performed by the components and functions of the AMS and ABS apparatus.

The processor 720 included in the AMS may determine whether the AMS supports multicarrier capabilities and the ABS may perform a multicarrier operation if the ABS supports the multicarrier capabilities. If the AMS supports the MC mode, the processor 730 included in the ABS may select and assign carriers suitable for the MC mode to the AMS.

That is, the AMS and the ABS may transmit messages necessary for the MC capability negotiation using the Tx module and receive messages necessary for the MC capability negotiation using the Rx module, under the control of the processors. In addition, the memory may store detailed values of parameters, information and fields necessary for MC capability negotiation.

Meanwhile, in the present invention, a Personal Digital Assistant (PDA), a cellular phone, a Personal Communication Service (PCS) phone, a Global System for Mobile (GSM) phone, a Wideband CDMA (WCDMA) phone, a Mobile Broadband System (MBS) phone, a hand-held PC, a laptop, a smart phone or a Multi Mode-Multi Band (MM-MB) terminal may be used as the AMS.

The smart phone is a terminal including merits of a mobile communication terminal and a PDA and is obtained by adding a data communication function, which is the function of the PDA, such as scheduling, fax transmission/reception and Internet access to the mobile communication terminal. The MM-MB terminal refers to a terminal which includes a multi modem chip and can operate both in a portable Internet system and another mobile communication system (e.g., a code division multiple access (CDMA) 2000 system, a Wideband CDMA (WCDMA) system, etc.).

The embodiments of the present invention may be implemented by various parts. For example, the embodiments of the present invention may be implemented by hardware, firmware, software or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. For example, the software code may be stored in the memories 780 and 790 so that it can be driven by the processors 720 and 730. The memory units are located inside or outside the processors, so that they can communicate with the aforementioned processors via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. Moreover, it will be apparent that some claims referring to specific claims may be combined with another claims referring to the other claims other than the specific claims to constitute the embodiment or add new claims by means of amendment after the application is filed.

INDUSTRIAL APPLICABILITY

The embodiments of the present invention are applicable to various wireless access systems. Examples of the various wireless access systems include $3^{rd}$ Generation Partnership Project (3GPP), 3GPP2 and/or Institute of Electrical and Electronic Engineers 802 (IEEE 802.xx) systems. The embodiments of the present invention are applicable to all technical fields using the various wireless access systems in addition to the various wireless access systems.

The invention claimed is:

1. A method for negotiating multicarrier capabilities in a wireless access system, the method comprising:
    performing, by a mobile terminal, a network entry procedure with a base station, the network entry procedure including:
        transmitting, by the mobile terminal, a first request message comprising a first multicarrier capability parameter indicating multicarrier capabilities supported by the mobile terminal; and
        receiving, by the mobile terminal, a first response message in response to the first request message, the first response message comprising a second multicarrier capability parameter indicating multicarrier capabilities supported by a base station,
    wherein, when the mobile terminal supports multicarrier capabilities, the method further comprises:

transmitting, by the mobile terminal, a second request message comprising multicarrier parameters set according to a hardware capability of the mobile terminal; and receiving, by the mobile terminal, a second response message in response to the second request message, the second response message comprising a carrier index (CI) field indicating assigned carriers that are assigned to the mobile terminal based on the second request message, wherein the assigned carriers are available in the base station.

2. The method according to claim 1, wherein:

the first multicarrier capability parameter indicates at least one of a no multicarrier mode, a basic multicarrier mode, a multicarrier aggregation mode, or a multicarrier switching mode, and the second multicarrier capability parameter indicates at least one of the no multicarrier mode, the basic multicarrier mode, the multicarrier aggregation mode, or the multicarrier switching mode.

3. The method according to claim 1, further comprising:

receiving a third response message transmitted to update the assigned carriers without a request from the mobile terminal when the assigned carriers have been changed.

4. A method for negotiating multicarrier capabilities in a wireless access system, the method comprising:

performing, by a base station, a network entry procedure with a mobile terminal, the network entry procedure including:

receiving, by the base station, a first request message comprising a first multicarrier capability parameter indicating multicarrier capabilities supported by a mobile terminal; and transmitting, by the base station, a first response message in response to the first request message, the first response message comprising a second multicarrier capability parameter indicating multicarrier capabilities supported by the base station, wherein, when the mobile terminal supports multicarrier capabilities, the method further comprises:

receiving, by the base station, a second request message comprising multicarrier parameters set according to a hardware capability of the mobile terminal; and transmitting, by the base station, a second response message in response to the second request message, the second response message comprising a carrier index (CI) field indicating assigned carriers that are assigned to the mobile terminal based on the second request message, wherein the assigned carriers are available in the base station.

5. The method according to claim 4, wherein:

the first multicarrier capability parameter indicates at least one of a no multicarrier mode, a basic multicarrier mode, a multicarrier aggregation mode, or a multicarrier switching mode; and the second multicarrier capability parameter indicates at least one of the no multicarrier mode, the basic multicarrier mode, the multicarrier aggregation mode, or the multicarrier switching mode.

6. The method according to claim 4, further comprising:

transmitting a third response message to update the assigned carriers without a request from the mobile terminal when the assigned carriers have been changed.

7. A mobile terminal for negotiating multicarrier capabilities in a wireless access system, the mobile terminal comprising:

a transmission module configured to transmit a Radio Frequency (RF) signal;

a reception module configured to receive an RF signal; and a processor comprising a medium access control (MAC) entity for controlling negotiation of the multicarrier capabilities, wherein the processor is configured to perform a network entry procedure with a base station, network entry procedure including:

transmitting a first request message comprising a first multicarrier capability parameter indicating multicarrier capabilities supported by the mobile terminal;

receiving a first response message in response to the first request message, the first response message comprising a second multicarrier capability parameter indicating multicarrier capabilities supported by the base station, wherein when the mobile terminal supports multicarrier capabilities, the processor is further configured to:

transmitting a second request message comprising multicarrier parameters set according to a hardware capability of the mobile terminal; and receiving a second response message in response to the second request message, the second response message comprising a carrier index (CI) field indicating assigned carriers that are assigned to the mobile terminal based on the second request message, wherein the assigned carriers are available in the base station.

8. The mobile terminal according to claim 7, wherein:

the first multicarrier capability parameter indicates at least one of a no multicarrier mode, a basic multicarrier mode, a multicarrier aggregation mode, or a multicarrier switching mode; and the second multicarrier capability parameter indicates at least one of the no multicarrier mode, the basic multicarrier mode, the multicarrier aggregation mode, or the multicarrier switching mode.

9. The mobile terminal according to claim 7, wherein the processor further controls the reception module to receive a third response message transmitted to update the assigned carriers without a request from the mobile terminal when the assigned carriers have been changed.

10. A base station for negotiating multicarrier capabilities in a wireless access system, the base station comprising:

a transmission module configured to transmit a Radio Frequency (RF) signal;

a reception module configured to receive an RF signal; and a processor comprising a medium access control (MAC) entity for controlling negotiation of the multicarrier capabilities, wherein the processor is configured to perform a network entry procedure with a base station, the network entry procedure including:

receiving a first request message comprising a first multicarrier capability parameter indicating multicarrier capabilities supported by a mobile terminal; and transmitting a first response message in response to the first request message, the first response message comprising a second multicarrier capability parameter indicating multicarrier capabilities supported by the base station, wherein, when the mobile terminal supports multicarrier capabilities, the processor is further configured to:

receiving a second request message comprising multicarrier parameters set according to a hardware capability of the mobile terminal; and transmitting a second response message in response to the second request message, the second response message comprising a carrier index (CI) field indicating assigned carriers that are assigned to the mobile terminal based on the second request message, wherein the assigned carriers are available in the base station.

11. The base station according to claim 10, wherein:

the first multicarrier capability parameter indicates at least one of a no multicarrier mode, a basic multicarrier mode, a multicarrier aggregation mode, or a multicarrier switching mode; and the second multicarrier capability parameter indicates at least one of the no multicarrier mode, the basic multicarrier mode, the multicarrier aggregation mode, or the multicarrier switching mode.

12. The base station according to claim 10, wherein the processor further controls the transmission module to transmit a third response message to update the assigned carriers without a request from the mobile terminal when the assigned carriers have been changed.

* * * * *